(12) United States Patent
Huang

(10) Patent No.: US 10,885,304 B2
(45) Date of Patent: Jan. 5, 2021

(54) ELECTRONIC APPARATUS AND UNDER-SCREEN FINGERPRINT SENSING METHOD THEREOF

(71) Applicant: Egis Technology Inc., Taipei (TW)

(72) Inventor: Chen-Chang Huang, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 16/697,215

(22) Filed: Nov. 27, 2019

(65) Prior Publication Data

US 2020/0210677 A1 Jul. 2, 2020

Related U.S. Application Data

(60) Provisional application No. 62/785,262, filed on Dec. 27, 2018.

(30) Foreign Application Priority Data

Nov. 4, 2019 (CN) .......................... 2019 1 1064224

(51) Int. Cl.
*G06K 9/00* (2006.01)
*G06F 3/041* (2006.01)
*G06K 9/20* (2006.01)
*G06K 9/32* (2006.01)

(52) U.S. Cl.
CPC ....... *G06K 9/00046* (2013.01); *G06F 3/0416* (2013.01); *G06K 9/209* (2013.01); *G06K 9/3233* (2013.01)

(58) Field of Classification Search
CPC ......... G06K 9/00006–0012; G06K 2009/0006
See application file for complete search history.

(56) References Cited

U.S. PATENT DOCUMENTS

| | | | | |
|---|---|---|---|---|
| 10,359,882 B2* | 7/2019 | Kim | .......................... | G06F 3/044 |
| 10,489,632 B2* | 11/2019 | Zuo | .................... | G06K 9/00073 |
| 10,528,786 B2* | 1/2020 | Lee | .................... | G06K 9/00912 |
| 10,558,835 B2* | 2/2020 | Kim | .................... | G06K 9/00067 |
| 2016/0349882 A1* | 12/2016 | Liu | .......................... | G06F 3/042 |

(Continued)

FOREIGN PATENT DOCUMENTS

| | | |
|---|---|---|
| CN | 104850292 | 9/2017 |
| CN | 107895143 | 4/2018 |
| CN | 107895143 A * | 4/2018 |

*Primary Examiner* — Patrick F Marinelli
(74) *Attorney, Agent, or Firm* — JCIPRNET

(57) ABSTRACT

An electronic apparatus and an under-screen fingerprint sensing method thereof are provided. The electronic apparatus includes a processing circuit, a touch panel, and a fingerprint sensing apparatus. The processing circuit is coupled to the touch panel and the fingerprint sensing apparatus. The fingerprint sensing apparatus includes a plurality of optical fingerprint sensing units. The touch panel provides touch information of a finger to the processing circuit in response to the finger touch detected by the touch panel. The processing circuit determines a fingerprint sensing region based on the touch information and drives a plurality of first sensing-enabled-units among the optical fingerprint sensing units based on the fingerprint sensing region, such that the fingerprint sensing apparatus obtains a fingerprint image of the finger via the first sensing-enabled-units. The first sensing-enabled-units are a part of the optical fingerprint sensing units.

12 Claims, 9 Drawing Sheets

(56) References Cited

U.S. PATENT DOCUMENTS

| | | | |
|---|---|---|---|
| 2018/0114047 A1* | 4/2018 | Kim | G06K 9/00026 |
| 2018/0204043 A1* | 7/2018 | Yang | G06K 9/0002 |
| 2018/0260071 A1* | 9/2018 | Kim | G06F 3/0412 |
| 2018/0300529 A1* | 10/2018 | Zuo | G06K 9/00013 |
| 2018/0314874 A1* | 11/2018 | Yang | G06K 9/00087 |
| 2019/0213381 A1* | 7/2019 | Lee | G06K 9/00912 |
| 2019/0251317 A1* | 8/2019 | Jiang | G06F 21/32 |
| 2019/0251329 A1* | 8/2019 | Jiang | G06F 21/81 |
| 2019/0266382 A1* | 8/2019 | Ji | G06F 1/325 |
| 2019/0286879 A1* | 9/2019 | Li | G06F 1/325 |
| 2020/0134290 A1* | 4/2020 | Liu | G06K 9/0002 |
| 2020/0151415 A1* | 5/2020 | Yuan | G06K 9/00087 |
| 2020/0151417 A1* | 5/2020 | Yuan | G06K 9/00013 |
| 2020/0160031 A1* | 5/2020 | Roh | H04L 51/04 |
| 2020/0175241 A1* | 6/2020 | Rasmussen | G06K 19/0718 |
| 2020/0210004 A1* | 7/2020 | Seo | G06K 9/00067 |
| 2020/0210677 A1* | 7/2020 | Huang | G06K 9/0002 |

\* cited by examiner

ELECTRONIC APPARATUS AND UNDER-SCREEN FINGERPRINT SENSING METHOD THEREOF

CROSS-REFERENCE TO RELATED APPLICATION

This application claims the priority benefits of U.S. provisional application Ser. No. 62/785,262, filed on Dec. 27, 2018, and China application serial no. 201911064224.8, filed on Nov. 4, 2019. The entirety of each of the above-mentioned patent applications is hereby incorporated by reference herein and made a part of this specification.

BACKGROUND OF THE INVENTION

1. Field of the Invention

The disclosure relates to a fingerprint sensing technology, and in particular, to an electronic apparatus and an under-screen fingerprint sensing method thereof.

2. Description of Related Art

Currently, fingerprint recognition technologies are widely applied to diversified electronic apparatuses or products separately or in a combined manner, including at least capacitive, optical, ultrasound-type, and other fingerprint recognition technologies continuously developed and improved. An under-screen optical fingerprint recognition technology in which a fingerprint sensing apparatus is disposed under a touch panel receives increasing attention, and it is predicted that embedded optical fingerprint recognition technologies in which a fingerprint sensing apparatus may be built into a touch panel will be continuously proposed and applied in the future.

FIG. 1A to FIG. 1C are schematic conceptual diagrams of fingerprint sensing regions in different sizes in conventional optical fingerprint recognition technologies. FIG. 1D is a schematic conceptual diagram of an optical fingerprint recognition sensor that matches a concept shown in FIG. 1A to FIG. 1C.

Referring to both FIG. 1A and FIG. 1D, an optical fingerprint sensor 20 may be applied to a handheld apparatus 100, and a display panel of the handheld apparatus 100 includes a small-area fingerprint sensing range 101 for a user to input a fingerprint through pressing (which may be, for example, a region occupying less than ¼ of an entire display panel size or a smaller area). A fingerprint image 11 is obtained through sensing and scanning based on a conventional fingerprint image sensing method by using the optical fingerprint sensor 20 under the small-area fingerprint sensing range 101. Specifically, according to the conventional fingerprint image sensing method, a small-area sensed image including the fingerprint image 11 is captured starting from an optical fingerprint sensing unit (Data(1), Line(1)) in a pixel sensing array (shown in FIG. 1D) of the optical fingerprint sensor 20, and sensed values are sequentially read from top to bottom and left to right until a sensed value of an optical fingerprint sensing unit (Data(m), Line(n)) is read, to obtain the small-area sensed image including the fingerprint image 11 for a subsequent fingerprint image recognition procedure.

Similarly, referring to FIG. 1B, FIG. 1C, and FIG. 1D, the optical fingerprint sensor 20 may be applied to handheld apparatuses 200 and 300. A large-area sensed image including fingerprint images 21 and 22 within a large-area fingerprint sensing range 201 (which may be, for example, ⅓ or ½ of an entire display panel size) is captured by using the optical fingerprint sensor 20. Alternatively, the optical fingerprint sensor 20 captures a full-screen sensed image including fingerprint images 31 and 32 within a full-screen fingerprint sensing range 301. Also, the optical fingerprint sensor 20 needs to read all sensed values within the large-area fingerprint sensing range 201 or the full-screen fingerprint sensing range 301 line by line and column by column, and output all the sensed values, to obtain the large-area sensed image including the fingerprint images 21 and 22 or the full-screen sensed image including the fingerprint images 31 and 32 for a subsequent image recognition procedure.

It can be seen from the foregoing actions that, regardless of recognition of the fingerprint image 11 within the small-area fingerprint sensing range 101, the fingerprint images 21 and 22 within the large-area fingerprint sensing range 201, or the fingerprint images 31 and 32 within the full-screen fingerprint sensing range 301, before fingerprint image analysis, selection, and recognition, the optical fingerprint sensor 20 needs to sequentially read all image sensing information within the fingerprint sensing range line by line and column by column. A large fingerprint sensing range brings more convenience for the user as a finger of the user is not limited by a need to press on a particular location for fingerprint recognition. However, a larger fingerprint sensing range means a larger amount of image data of the fingerprint image, which is prone to a transmission error or a data transmission delay in a data output process. In addition, recognition fingerprint may be significantly decelerated in the subsequent fingerprint recognition procedure.

SUMMARY OF THE INVENTION

In view of this, the disclosure provides an electronic apparatus and an under-screen fingerprint sensing method thereof, to provide a large-range fingerprint sensing function and accelerate fingerprint recognition.

An embodiment of the disclosure provides an electronic apparatus, including a processing circuit, a touch panel, and a fingerprint sensing apparatus. The processing circuit is coupled to the touch panel and the fingerprint sensing apparatus. The fingerprint sensing apparatus includes a plurality of optical fingerprint sensing units. The touch panel provides touch information of a finger to the processing circuit in response to a finger touch detected by the touch panel. The processing circuit determines a fingerprint sensing region based on the touch information and drives a plurality of first sensing-enabled-units among the optical fingerprint sensing units based on the fingerprint sensing region, such that the fingerprint sensing apparatus obtains a fingerprint image of the finger via the first sensing-enabled-units. The first sensing-enabled-units are a part of the optical fingerprint sensing units.

An embodiment of the disclosure provides an under-screen fingerprint sensing method applied to an electronic apparatus. The electronic apparatus includes a processing circuit, a touch panel, and a fingerprint sensing apparatus. The fingerprint sensing apparatus includes a plurality of optical fingerprint sensing units. The method includes the following steps: providing, by the touch panel, touch information of a finger to the processing circuit in response to a finger touch detected by the touch panel; determining, by the processing circuit, a fingerprint sensing region based on the touch information; and driving, by the processing circuit, a plurality of first sensing-enabled-units among the optical fingerprint sensing units based on the fingerprint sensing region, such that the fingerprint sensing apparatus obtains a fingerprint image of the finger via the first sensing-enabled-units. The first sensing-enabled-units are a part of the optical fingerprint sensing units.

Based on the above, in the embodiments of the disclosure, the processing circuit may locate the fingerprint sensing region (a region of interest (ROI)) in a large-range sensing region based on the touch information of the finger, and drive the first sensing-enabled-units based on coverage of the fingerprint sensing region to obtain the fingerprint image. Therefore, compared with driving all optical fingerprint sensing units in the large-range sensing region to generate a fingerprint image, driving some optical fingerprint sensing units in the embodiments of the disclosure can achieve faster recognition fingerprint.

In order to make the aforementioned features and advantages of the invention comprehensible, embodiments accompanied with accompanying drawings are described in detail below.

DESCRIPTION OF THE EMBODIMENTS

Figure 1A:
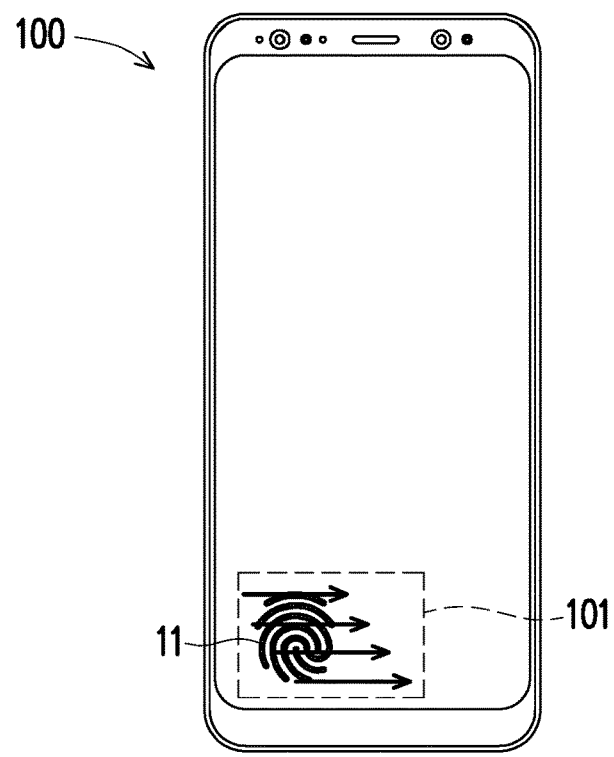
FIG. 1A to FIG. 1C are schematic conceptual diagrams of fingerprint sensing regions in different sizes in conventional optical fingerprint recognition technologies.
Figure 1B:
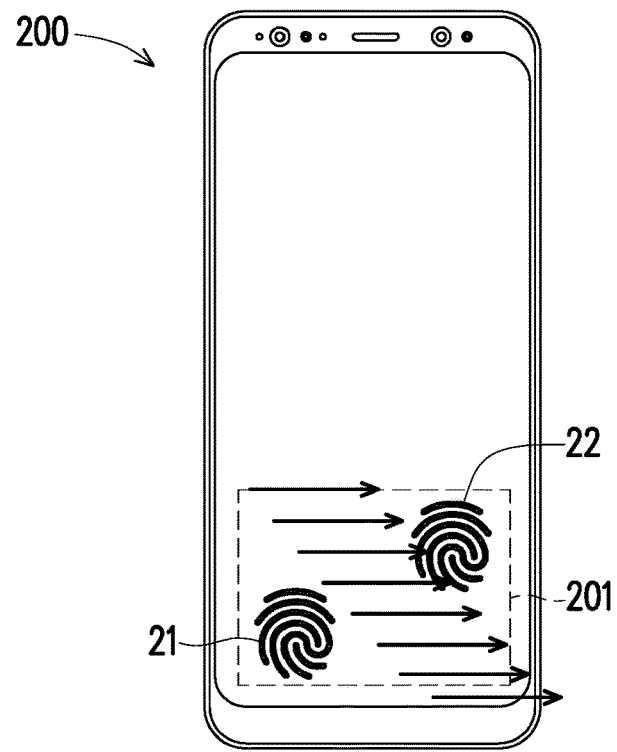
Figure 1C:
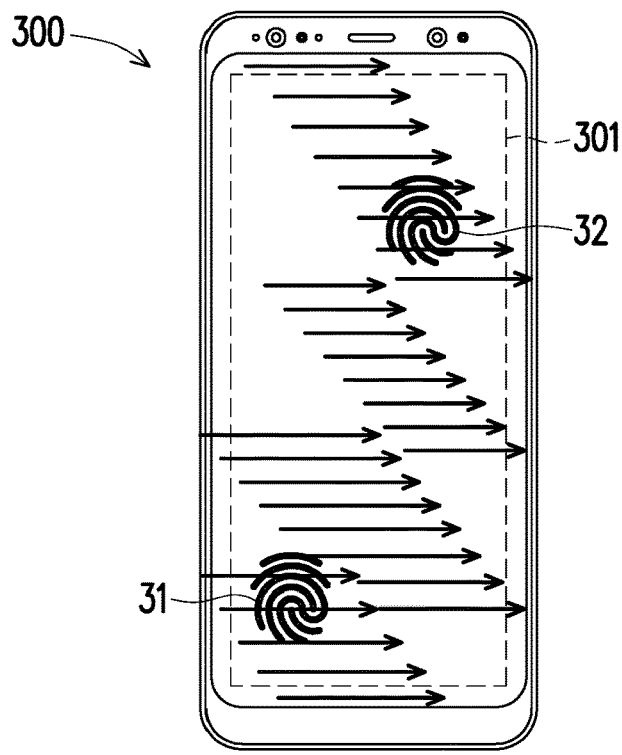
Figure 1D:
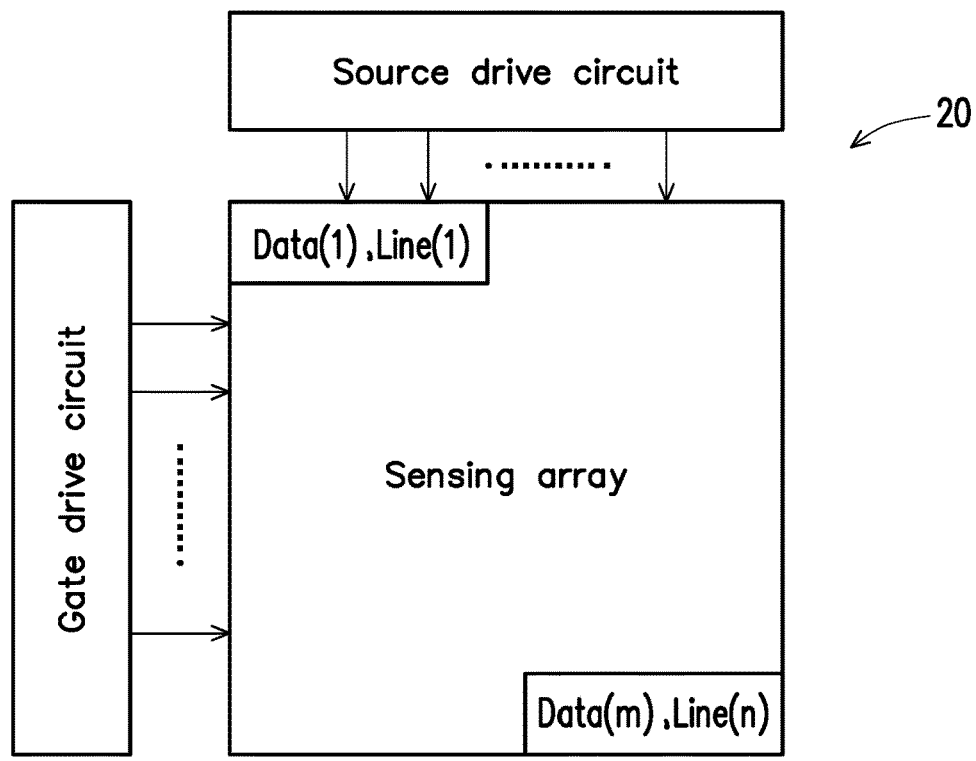
FIG. 1D is a schematic conceptual diagram of an optical fingerprint recognition sensor that matches a concept shown in FIG. 1A to FIG. 1C.

Reference will now be made in detail to the present preferred embodiments of the invention, examples of which are illustrated in the accompanying drawings.

Wherever possible, the same reference numbers are used in the drawings and the description to refer to the same or like parts.

Figure 2:
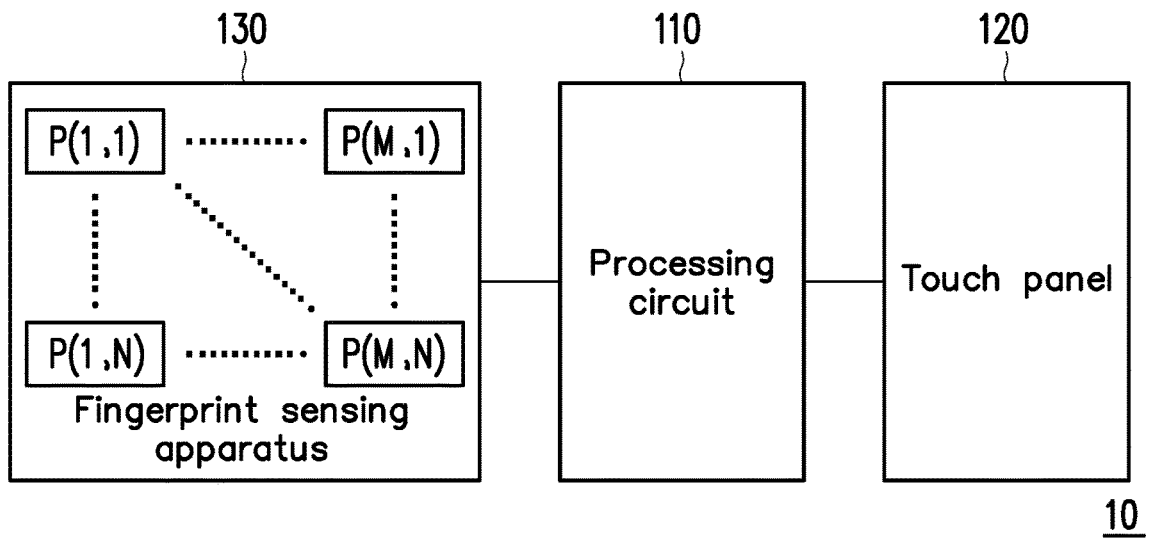
FIG. 2 is a schematic block diagram of an electronic apparatus according to an embodiment of the disclosure.

FIG. 2 is a schematic block diagram of an electronic apparatus according to an embodiment of the disclosure. Referring to FIG. 2, an electronic apparatus 10 includes a processing circuit 110, a touch panel 120, and a fingerprint sensing apparatus 130. The electronic apparatus 10 may be a smart phone, a panel, a game console, or another electronic apparatus having an optical under-screen fingerprint recognition function, which is not limited in the disclosure.

In an embodiment, the processing circuit 110 is coupled to the touch panel 120 and the fingerprint sensing apparatus 130. The processing circuit 110 may include a central processing unit (CPU), an application processor (AP), or another programmable general-purpose or special-purpose microprocessor, a digital signal processor (DSP), a programmable controller, an application-specific integrated circuit (ASIC), a programmable logic device (PLD), or a combination thereof. In other words, the processing circuit 110 may be implemented by one or more integrated circuits (ICs), which is not limited in the disclosure. For example, the processing circuit 110 may include an application processor and a touch IC.

The touch panel 120 includes a plurality of touch sensing elements arranged in an array. The touch sensing elements are arranged in lines and columns and configured to detect a touch event. The touch event includes touch of a finger, a palm, a body part, or another object on the touch panel 120. The touch sensing element may be, for example, a capacitive touch sensing element, a surface acoustic wave touch sensing element, an electromagnetic touch sensing element, a near field imaging touch sensing element, and the like. In an embodiment, the touch sensing elements may be integrated with a display module to form the touch panel.

The fingerprint sensing apparatus 130 includes a plurality of optical fingerprint sensing units P(1, 1), . . . , P(M, 1), . . . , P(1, N), . . . , and P(M, N) arranged in an array. M and N each may be any integer determined based on a design requirement. Each of the optical fingerprint sensing units P(1, 1) to P(M, N) includes a photosensitive diode for photoelectric conversion. It should be noted that, the optical fingerprint sensing units P(1, 1) to P(M, N) may be sensing units of one or more optical fingerprint sensors. In other words, the fingerprint sensing apparatus 130 may include one or more optical fingerprint sensors, which is not limited in the disclosure. In addition to the pixel array for image sensing, the optical fingerprint sensor may further include elements such as an analog front end (AFE), an analog-to-digital converter (ADC), and an image signal processor (ISP). The optical fingerprint sensing units P(1, 1) to P(M, N) can be activated and output image sensing values in response to drive signals provided by the processing circuit 110.

Figure 3:
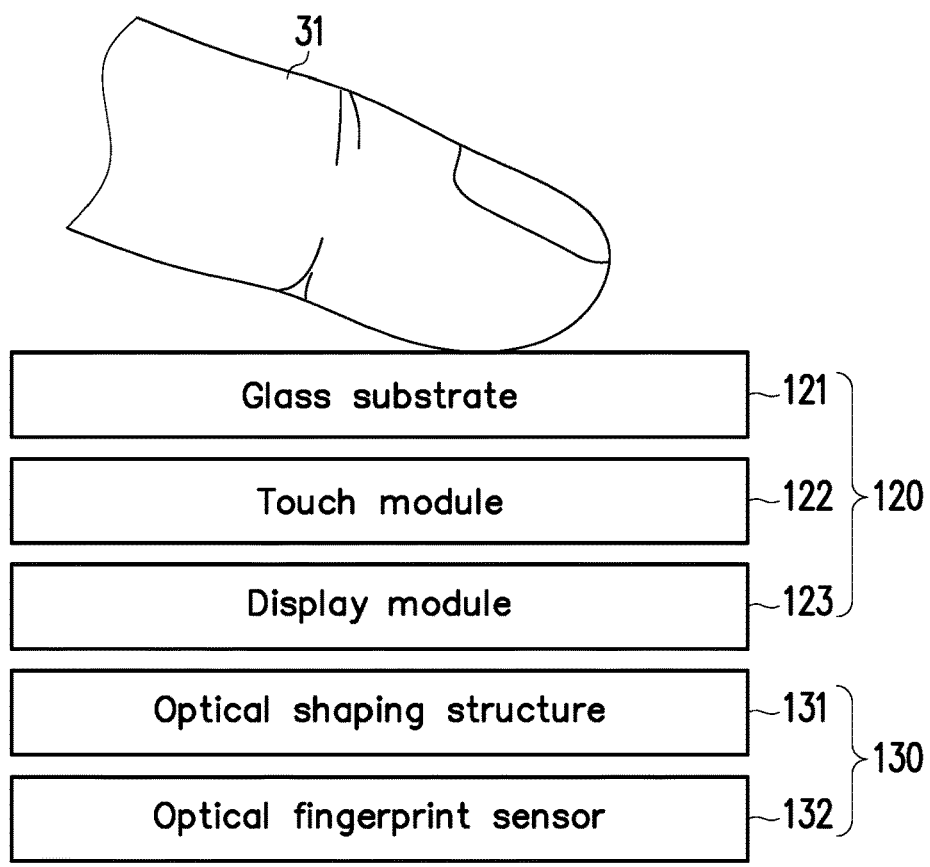
FIG. 3 is a schematic configuration diagram of a touch panel and a fingerprint sensing apparatus according to an embodiment of the disclosure.

FIG. 3 is a schematic configuration diagram of a touch panel and a fingerprint sensing apparatus according to an embodiment of the disclosure. Referring to FIG. 3, the touch panel 120 may include a glass substrate 121, a touch module 122, and a display module 123. The display module 123 may be, for example, a display apparatus including an organic light-emitting diode (OLED) display panel, an active matrix organic light-emitting diode (AMOLED) display panel, or a liquid crystal display (LCD) display panel, which is not limited in the disclosure.

The fingerprint sensing apparatus 130 may include an optical shaping structure 131 and an optical fingerprint sensor 132. However, a quantity of optical fingerprint sensors in the disclosure is not limited to that shown in FIG. 3. FIG. 3 is used only to exemplarily show an implementable example of the disclosure. The optical shaping structure 131 may be, for example, a collimator or an optical lens. The optical fingerprint sensor 132 is an image sensor including the optical fingerprint sensing units P(1, 1) to P(M, N). In an embodiment, the fingerprint sensing apparatus 130 is disposed under the touch panel 120.

In an embodiment, the touch panel 120 provides touch information of a finger 31 of a user to the processing circuit 110 in response to a finger 31 touch or press detected by the touch panel 120. The touch information is, for example, capacitive sensing information, resistive sensing information, or another type of touch sensing information, which is not limited in the disclosure. The touch information may reflect a touch location and a touch range of the finger 31. Correspondingly, the processing circuit 110 may determine a location and a size of a fingerprint sensing region (an image capture region) based on the touch information, and drive a plurality of first sensing-enabled-units among the optical fingerprint sensing units P(1, 1) to P(M, N) based on the fingerprint sensing region, such that the fingerprint sensing apparatus 130 obtains a fingerprint image of the finger 31 via the first sensing-enabled-units. Herein, the driven first sensing-enabled-units are a part of the optical fingerprint sensing units.

In other words, the processing circuit 110 may drive some of the optical fingerprint sensing units P(1, 1) to P(M, N) based on the touch location and the touch range of the finger 31 for fingerprint sensing, rather than drive all the optical fingerprint sensing units P(1, 1) to P(M, N). Specifically, the driven first sensing-enabled-units among the optical fingerprint sensing units P(1, 1) to P(M, N) may receive fingerprint image light shaped by the optical shaping structure 131, and the fingerprint image of the finger 31 may be generated based on sensing results of the first sensing-enabled-units.

Therefore, the processing circuit 110 may perform a fingerprint recognition function based on the fingerprint image. It can be seen from the above that, because a smaller quantity of optical fingerprint sensing units are driven for image sensing, power consumption is reduced, and fingerprint recognition can be accelerated due to a decrease in data amount.

In addition, in an embodiment, the electronic apparatus 10 may further support a multi-touch function, to sense fingerprint images of a plurality of fingers at the same time. Specifically, in response to touch of a plurality of fingers (the finger 31 and another finger) detected by a sensing surface of the touch panel 120, the touch panel 120 may provide touch information of the another finger to the processing circuit 110 in addition to the touch information of the finger 31. The processing circuit 110 may determine another fingerprint sensing region based on the touch information of the another finger and drive a plurality of second sensing-enabled-units among the optical fingerprint sensing units P(1, 1) to P(M, N) based on the another fingerprint sensing region, such that the fingerprint sensing apparatus 130 obtains another fingerprint image of the another finger via the second sensing-enabled-units. In other words, the processing circuit 110 may determine a plurality of fingerprint sensing regions based on the touch information of the plurality of fingers, so as to drive optical fingerprint sensing units corresponding to the fingerprint sensing regions. It should be noted that, a quantity of fingerprints that can be sensed at the same time by the electronic apparatus 10 supporting multi-point fingerprint sensing is not limited to the above, and a quantity of fingerprint sensing regions is not limited in the disclosure.

Figure 4A:
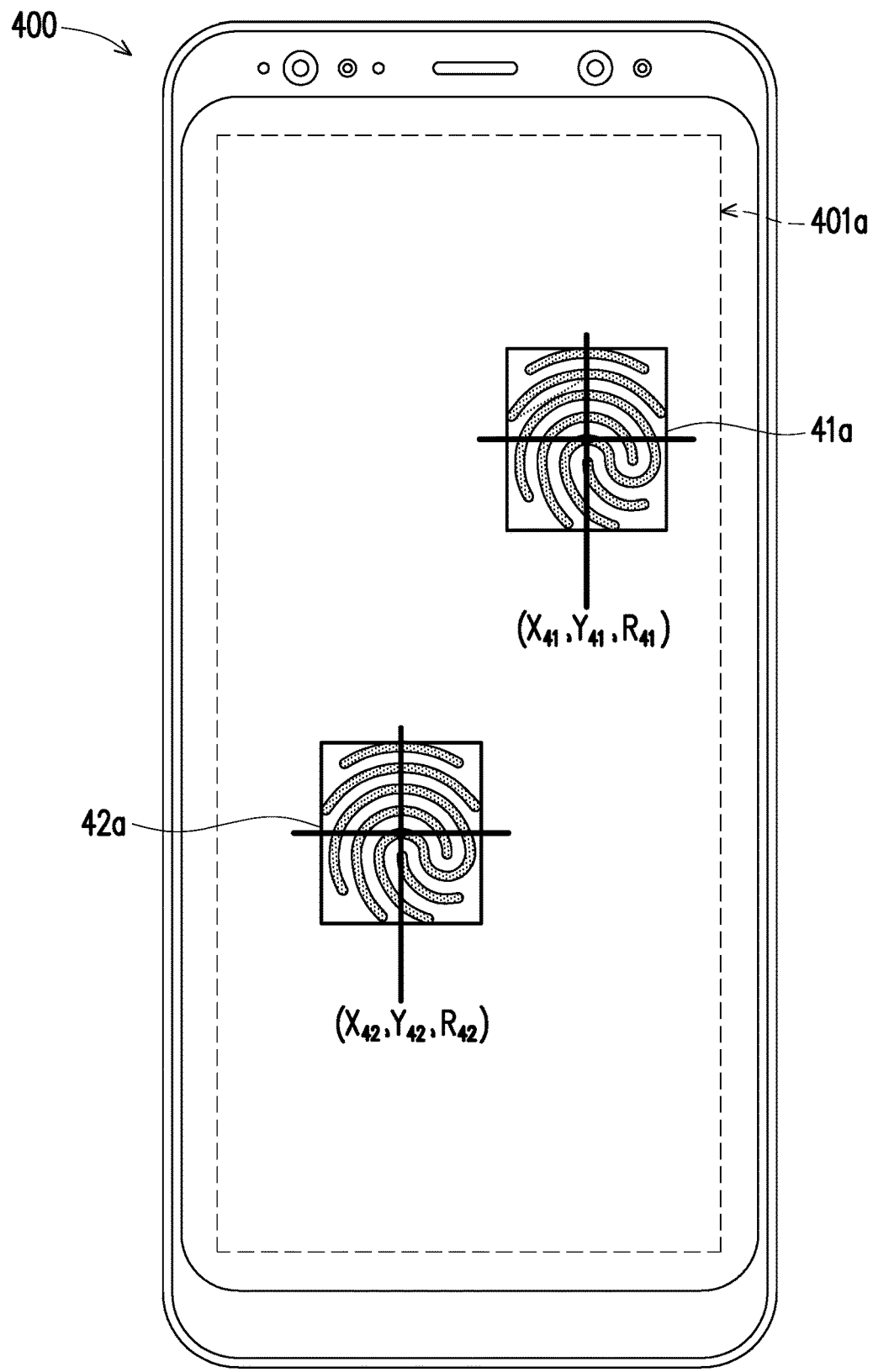
FIG. 4A and FIG. 4B are schematic diagrams of fingerprint sensing regions according to an embodiment of the disclosure.
Figure 4B:
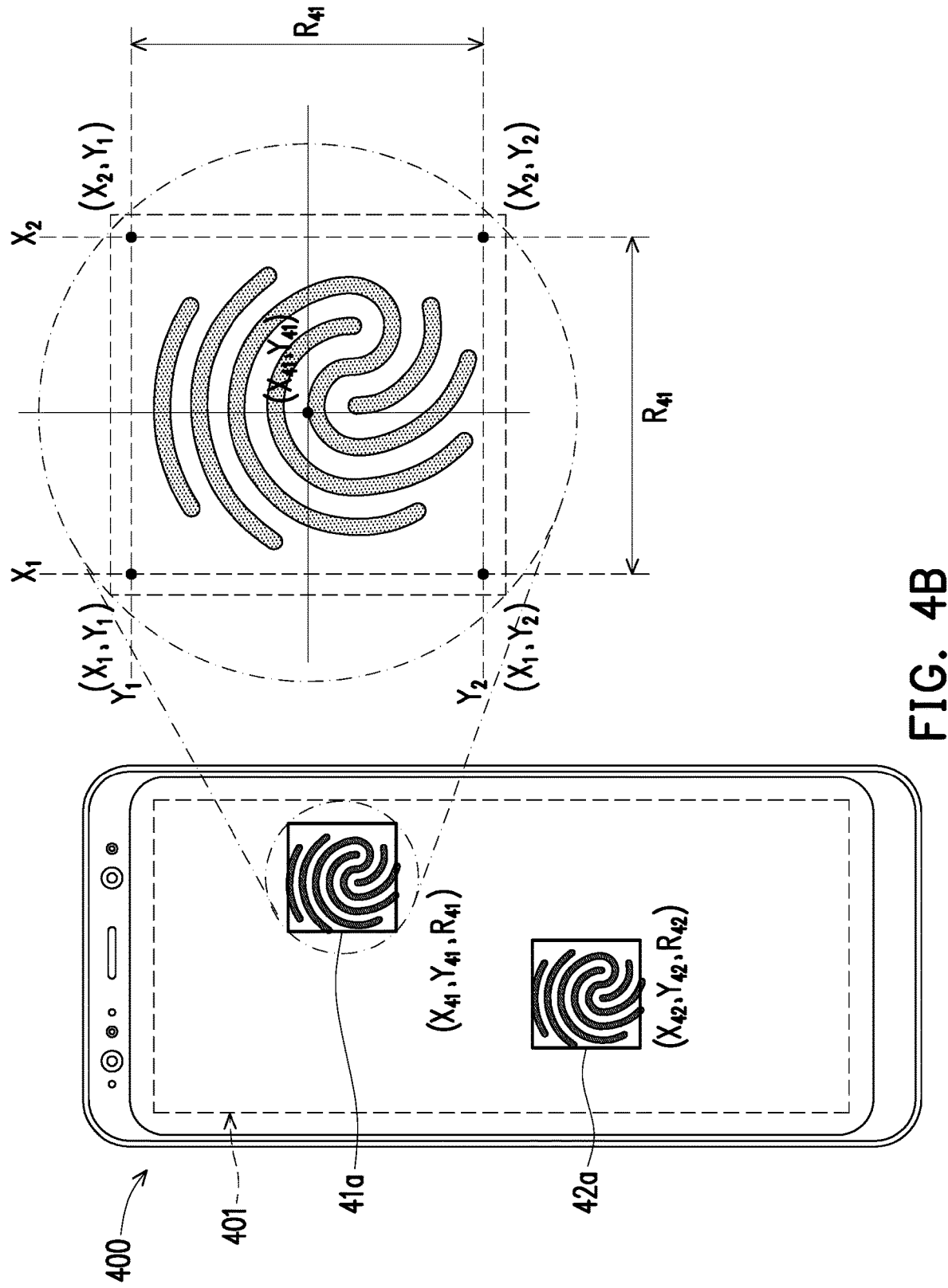

FIG. 4A and FIG. 4B are schematic diagrams of fingerprint sensing regions according to an embodiment of the disclosure. Referring to both FIG. 3 and FIG. 4A, an electronic apparatus 400 includes a touch panel 120 integrated with a display module 123, and a full-screen fingerprint sensing apparatus 130 under the touch panel 120. Further, in the present implementation example, the electronic apparatus 400 can support a full-screen under-screen fingerprint recognition function. To be specific, the fingerprint sensing apparatus 130 can sense any fingerprint information within a fingerprint sensing range 401.

When a user's finger touches the touch panel 120, the touch panel 120 may provide touch information to the processing circuit 110 based on a touch charge change (for example, a voltage change or a current change) generated on a surface of the touch panel 120. Accordingly, the processing circuit 110 may determine a location $(X_{41}, Y_{41})$ and a size $R_{41}$ of a fingerprint sensing region 41$a$ based on the touch information of the finger. The location $(X_{41}, Y_{41})$ may be a center coordinate location of the fingerprint sensing region 41$a$, but the disclosure is not limited thereto. In other embodiments, the location may be a vertex coordinate location or the like of the fingerprint sensing region 41$a$. The size $R_{41}$ is, for example, a side length or the like of the fingerprint sensing region 41$a$. In the present implementation example, assuming that the fingerprint sensing region 41$a$ is a square, the size $R_{41}$ may be a side length of the square sensing region. Then in the present implementation example, the processing circuit 110 drives a plurality of first sensing-enabled-units in the fingerprint sensing region 41$a$, and obtains a fingerprint image based only on image sensing values of the first sensing-enabled-units in the fingerprint sensing region 41$a$.

According to the same principle, the processing circuit 110 may determine a location $(X_{42}, Y_{42})$ and a size $R_{42}$ of a fingerprint sensing region 42$a$ based on the touch information of another finger. Then in the present implementation example, the processing circuit 110 drives a plurality of second sensing-enabled-units in the fingerprint sensing region 42$a$, and obtains a fingerprint image based only on image sensing values of the second sensing-enabled-units in the fingerprint sensing region 42$a$.

Referring to FIG. 4B, a further description is provided below by using the location $(X_{41}, Y_{41})$ and the size $R_{41}$ of the fingerprint sensing region 41$a$ as an example.

After determining the location $(X_{41}, Y_{41})$ and the size $R_{41}$ based on the touch information, the processing circuit 110 may obtain coverage of the fingerprint sensing region 41$a$ based on the location $(X_{41}, Y_{41})$ and the size $R_{41}$. Specifically, the processing circuit 110 may obtain coordinates $(X_1, Y_1)$, $(X_2, Y_1)$, $(X_1, Y_2)$, and $(X_2, Y_2)$ of four anchor points of the fingerprint sensing region 41$a$ by using the location $(X_{41}, Y_{41})$ as a center and using the size $R_{41}$ as a side length of a square. Therefore, the processing circuit 110 may determine to-be-driven optical fingerprint sensing units based on the coordinates $(X_1, Y_1)$, $(X_2, Y_1)$, $(X_1, Y_2)$, and $(X_2, Y_2)$ of the four anchor points. For example, each of the optical fingerprint sensing units P(1, 1) to P(M, N) has corresponding array location information based on an array location. Therefore, the processing circuit 110 may determine, based on array location information of the optical fingerprint sensing units P(1, 1) to P(M, N), optical fingerprint sensing units within a region range bounded by the coordinates $(X_1, Y_1)$, $(X_2, Y_1)$, $(X_1, Y_2)$, and $(X_2, Y_2)$ of the four anchor points, to select first sensing-enabled-units required for image sensing. It can be seen from the above that, in the present implementation example, because only optical fingerprint sensing units in the fingerprint sensing regions 41$a$ and 42$a$ are driven to output image sensing values, a fingerprint image data amount can be significantly reduced.

It should be noted that, in an embodiment, the touch information may include distribution of a touch sensing value obtained by the touch panel 120 after the touch panel 120 detects the touch of the finger, and the processing circuit 110 may determine the location and the size of the fingerprint sensing region based on distribution of the touch sensing value. A capacitive touch panel 120 is used as an example. The touch information may include distribution of capacitance sensing value that reflects the touch of the finger, and the processing circuit 110 may determine the location and the size of the fingerprint sensing region based on a distribution feature of distribution of the capacitance sensing value. How to determine the location and the size is further described in the following embodiment.

Figure 5:
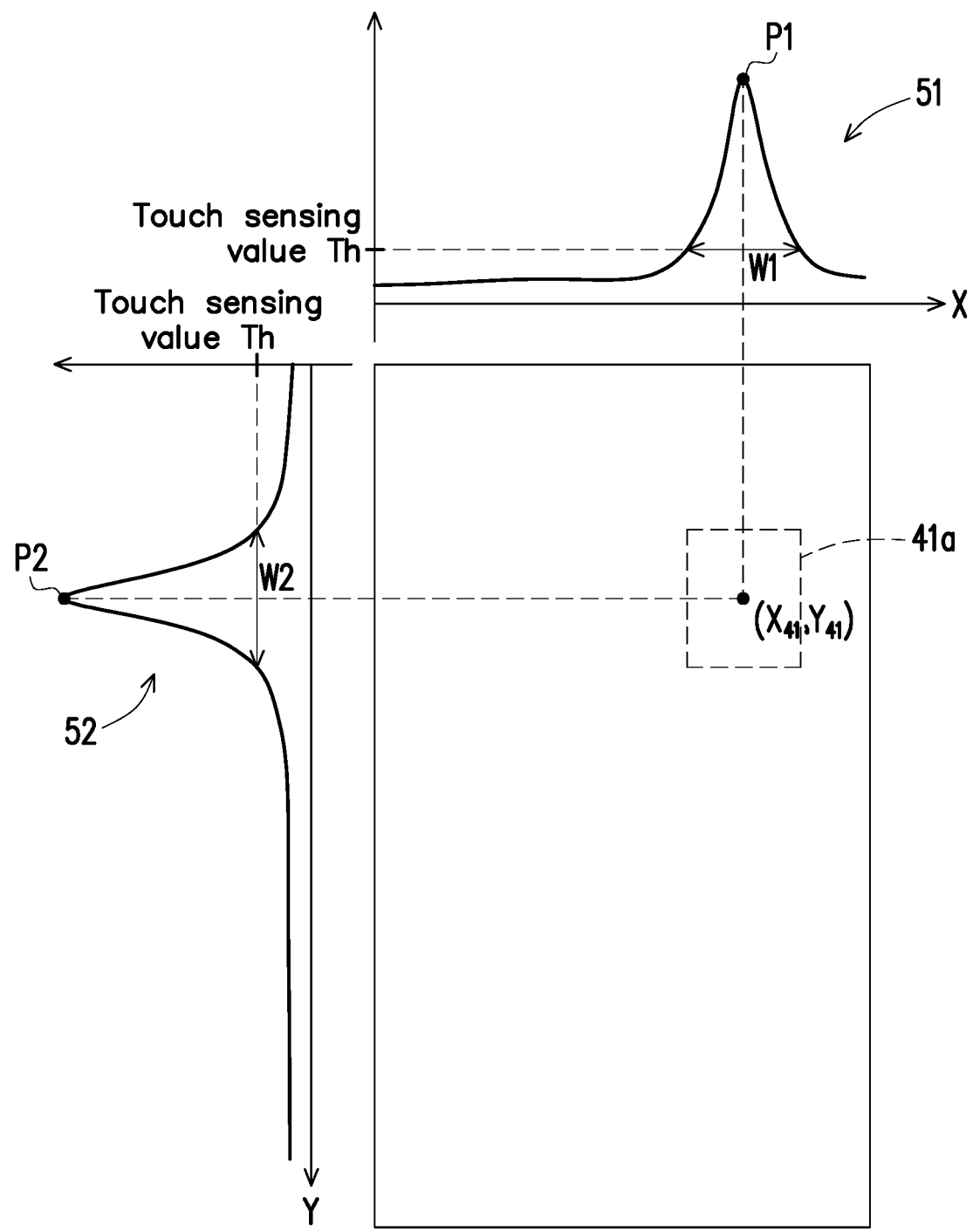
FIG. 5 is a schematic diagram of determining a fingerprint sensing region based on a touch sensing value according to an embodiment of the disclosure.

FIG. 5 is a schematic diagram of determining a fingerprint sensing region based on a touch sensing value according to an embodiment of the disclosure. Referring to FIG. 5, when the finger touches the touch panel 120, the touch panel 120 may obtain distribution of a touch sensing value. Herein, distribution of the touch sensing value may include distribution of a first touch sensing value 51 associated with an X axial direction (a first axial direction) and distribution of a second touch sensing value 52 associated with a Y axial direction (a second axial direction).

In the present implementation example, the processing circuit 110 may determine the location of the fingerprint sensing region 41$a$ based on a peak of distribution of the touch sensing value, and determine the size of the fingerprint sensing region 41$a$ based on a distribution variation width of distribution of the touch sensing value. In the example of FIG. 5, the processing circuit 110 may obtain a coordinate X of the location of the fingerprint sensing region 41$a$ based on a peak P1 of distribution of the first touch sensing value 51. The processing circuit 110 may obtain a coordinate Y of the location of the fingerprint sensing region 41$a$ based on a peak P2 of distribution of the second touch sensing value 52. As shown in FIG. 5, the processing circuit 110 may obtain the location $(X_{41}, Y_{41})$ of the fingerprint sensing region 41$a$ based on the peak P1 and the peak P2. The location $(X_{41}, Y_{41})$ is a center coordinate location of the fingerprint sensing region 41$a$, but the disclosure is not limited thereto.

In addition, in the example of FIG. 5, the processing circuit 110 may determine a side length of the size based on a distribution variation width W1 of distribution of the first touch sensing value 51 or a distribution variation width W2 of distribution of the second touch sensing value 52. The fingerprint sensing region 41$a$ is a square including the side length. For example, the processing circuit may use the distribution variation width W1 or the distribution variation width W2 as the side length of the size, or the processing circuit may use an average value of the distribution variation width W1 and the distribution variation width W2 as the side length of the size. In addition, the distribution variation width W1 and the distribution variation width W2 may be determined by comparing a touch sensing value with a threshold Th.

Figure 6A:
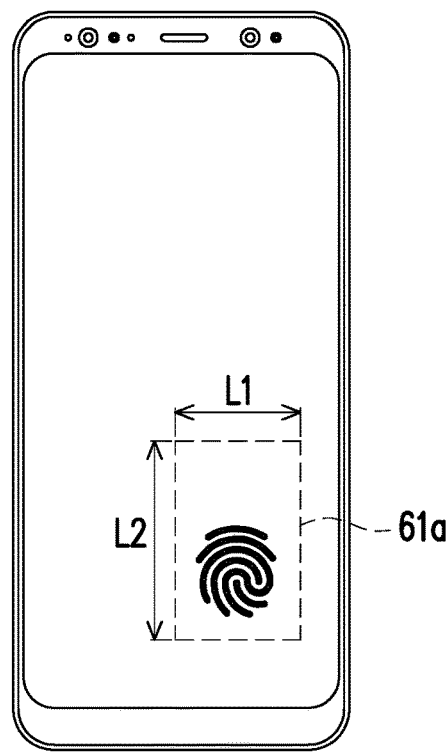
FIG. 6A and FIG. 6B are schematic diagrams of rectangular fingerprint sensing regions according to an embodiment of the disclosure.
Figure 6B:
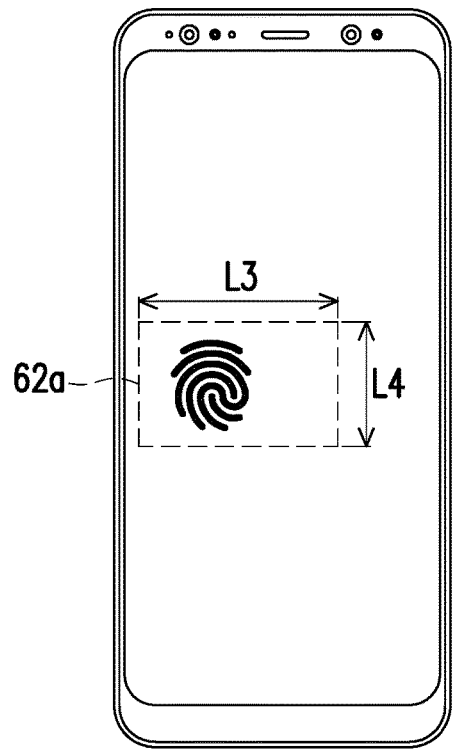

It should be noted that, in FIG. 4A, FIG. 4B, and FIG. 5, the fingerprint sensing region is a square region as an example, but the disclosure is not limited thereto. In an embodiment, the fingerprint sensing region may alternatively be a rectangle region including a first side length and a second side length. FIG. 6A and FIG. 6B are schematic diagrams of rectangular fingerprint sensing regions according to an embodiment of the disclosure. Referring to FIG. 6A, the processing circuit 110 may obtain a first side length L1 of a size based on a distribution variation width of distribution of the first touch sensing value in an X axial direction, and obtain a second side length L2 of the size based on a distribution variation width of distribution of the second touch sensing value in a Y axial direction. In other words, a fingerprint sensing region 61$a$ is a rectangle including the first side length L1 and the second side length L2. Referring to FIG. 6B, the processing circuit 110 may obtain a first side length L3 of a size based on a distribution variation width of distribution of the first touch sensing value in an X axial direction, and obtain a second side length L4 of the size based on a distribution variation width of distribution of the second touch sensing value in a Y axial direction. In other words, a fingerprint sensing region 62$a$ is a rectangle including the first side length L3 and the second side length L4.

In an embodiment, the processing circuit 110 may provide a plurality of drive signals to the first sensing-enabled-units based on the location and the size of the fingerprint sensing region, such that the fingerprint sensing apparatus 130 obtains image sensing information of the fingerprint image by using the first sensing-enabled-units. Specifically, after the fingerprint sensing region is generated, the processing circuit 110 may determine, based on the fingerprint sensing region, to drive some of the optical fingerprint sensing units P(1, 1) to P(M, N), and generate the fingerprint image by using only some of the optical fingerprint sensing units P(1, 1) to P(M, N).

Figure 7:
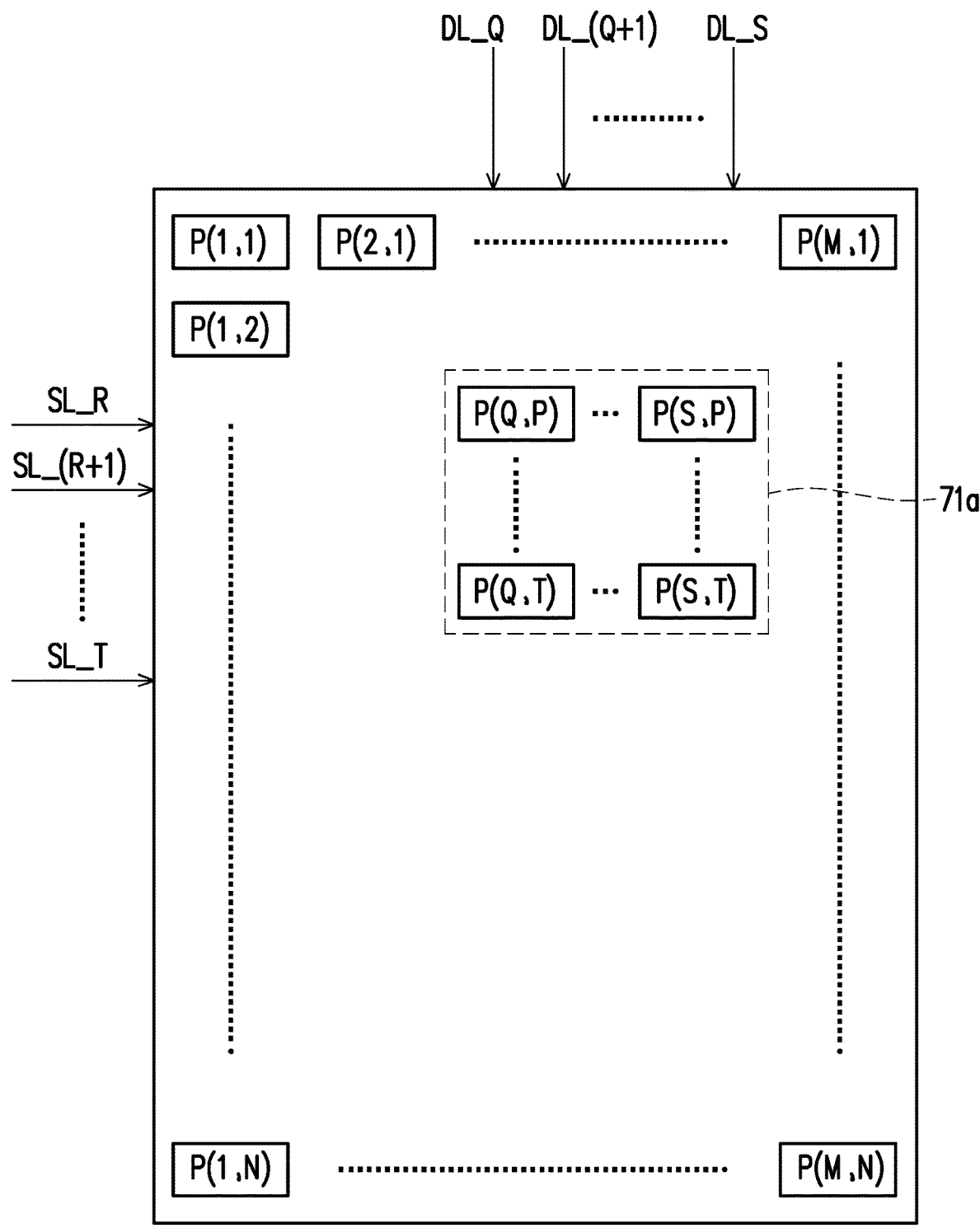
FIG. 7 is a schematic diagram of starting a sensing-enabled-unit according to an embodiment of the disclosure.

For example, FIG. 7 is schematic diagram of generating a fingerprint image by using a sensing-enabled-unit according to an embodiment of the disclosure. Referring to FIG. 7, after the processing circuit 110 obtains a fingerprint sensing region 71$a$, the processing circuit 110 may provide drive signals only to the first sensing-enabled-units among the optical fingerprint sensing units P(1, 1) to P(M, N). Q and S each are an integer less than M. R and T each are an integer less than N. S is larger than Q. R larger than T. In the present embodiment, the first sensing-enabled-units are optical fingerprint sensing units P(Q, R), P(S, R), P(Q, T), . . . , and P(S, T). The drive signals may include gate drive signals SL_R, SL_(R+1), . . . , and SL_T and source drive signals DL_Q, DL_(Q+1), . . . , and DL_S. The first sensing-enabled-units may start and perform sensing in response to the received gate drive signals SL_R, SL_(R+1), . . . , and SL_T, and output image sensing values in response to the received source drive signals DL_Q, DL_(Q+1), . . . , and DL_S. In other words, it can be seen from the above that, compared with driving the full-screen optical fingerprint sensing units P(1, 1) to P(M, N), fewer drive signals need to be provided in the present embodiment of the disclosure, which reduces power consumption.

In addition, an image size of the fingerprint image generated by using the first sensing-enabled-units is smaller than an image size of a full-screen fingerprint image generated by using all the optical fingerprint sensing units P(1, 1) to P(M, N). In an embodiment, the image size of the fingerprint image generated by using the first sensing-enabled-units is determined based on a quantity of the first sensing-enabled-units. Specifically, in the example of FIG. 7, the image size of the fingerprint image may be reduced to (S−Q+1)*(T−R+1). It can be seen from the above that, compared with the image size M*N of the full-screen fingerprint image, the fingerprint image captured based on the image sensing region includes less data, and therefore a data transmission error can be avoided and less data needs to be processed.

Figure 8:
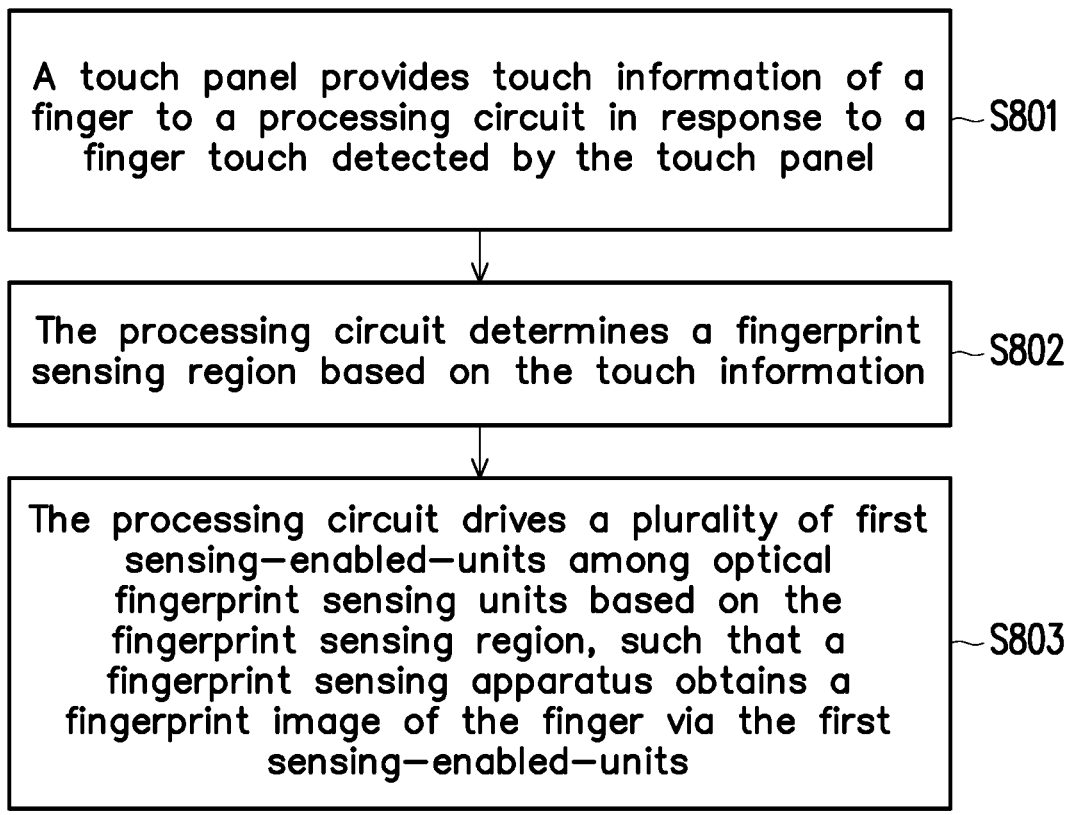
FIG. 8 is a flowchart of an under-screen fingerprint sensing method according to an embodiment of the disclosure.

FIG. 8 is a flowchart of an under-screen fingerprint sensing method according to an embodiment of the disclosure. In step S801, a touch panel provides touch information of a finger to a processing circuit in response to a finger touch detected by the touch panel. In step S802, the processing circuit determines a fingerprint sensing region based on the touch information. In step S803, the processing circuit drives a plurality of first sensing-enabled-units among optical fingerprint sensing units based on the fingerprint sensing region, such that a fingerprint sensing apparatus obtains a fingerprint image of the finger via the first sensing-enabled-units.

It should be noted that the steps in FIG. 8 are described above in detail, and the descriptions thereof are omitted herein. The steps in FIG. 8 may be implemented by using program code or a circuit, which is not limited in the disclosure. In addition, the method in FIG. 8 may be used in combination with the foregoing example embodiment, or may be used alone, which is not limited in the disclosure.

Based on the above, in the embodiments of the disclosure, while large-range fingerprint sensing is implemented, some optical fingerprint sensing units in a pixel sensing array are selected and driven for fingerprint sensing. Since fewer drive signals are provided, power consumption can be effectively reduced. In addition, because a fingerprint image is in a smaller image size, a data transmission error can be avoided and less data needs to be processed, which improves the accuracy and speed of fingerprint recognition.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus, comprising:
a processing circuit;
a touch panel, coupled to the processing circuit; and
a fingerprint sensing apparatus, coupled to the processing circuit and comprising a plurality of optical fingerprint sensing units, wherein
the touch panel provides touch information of a finger to the processing circuit in response to a finger touch detected by the touch panel,
the processing circuit determines a fingerprint sensing region based on the touch information and drives a plurality of first sensing-enabled-units among the optical fingerprint sensing units based on the fingerprint sensing region, such that the fingerprint sensing apparatus obtains a fingerprint image of the finger via the first sensing-enabled-units, wherein the first sensing-enabled-units are a part of the optical fingerprint sensing units,
the touch information comprises distribution of a touch sensing value obtained by the touch panel after the touch panel detects the touch of the finger,
the processing circuit determines a location and a size of the fingerprint sensing region based on distribution of the touch sensing value, and
the processing circuit determines the location of the fingerprint sensing region based on a peak of distribution of the touch sensing value, and determines the size of the fingerprint sensing region based on a distribution variation width of distribution of the touch sensing value.

2. The electronic apparatus according to claim 1, wherein distribution of the touch sensing value comprises distribution of a first touch sensing value associated with a first axial direction and distribution of a second touch sensing value associated with a second axial direction, and the processing circuit determines a first side length of the size based on a distribution variation width of distribution of the first touch sensing value, and determines a second side length of the size based on a distribution variation width of distribution of the second touch sensing value, and the fingerprint sensing region is a rectangle having the first side length and the second side length.

3. The electronic apparatus according to claim 1, wherein distribution of the touch sensing value comprises distribution of a first touch sensing value associated with a first axial direction and distribution of a second touch sensing value associated with a second axial direction, and the processing circuit determines a side length of the size based on a distribution variation width of distribution of the first touch sensing value and a distribution variation width of distribution of the second touch sensing value, and the fingerprint sensing region is a square having the side length.

4. The electronic apparatus according to claim 1, wherein the processing circuit provides a plurality of drive signals to the first sensing-enabled-units based on the location and the size of the fingerprint sensing region, such that the fingerprint sensing apparatus obtains image sensing information of the fingerprint image by using the first sensing-enabled-units.

5. The electronic apparatus according to claim 1, wherein an image size of the fingerprint image is determined based on a quantity of the first sensing-enabled-units.

6. The electronic apparatus according to claim 1, wherein the touch panel provides another touch information of another finger to the processing circuit in response to touch of both the finger and the other finger detected by the touch panel, and
the processing circuit determines another fingerprint sensing region based on the another touch information and drives a plurality of second sensing-enabled-units among the optical fingerprint sensing units based on the another fingerprint sensing region, such that the fingerprint sensing apparatus obtains another fingerprint image of the another finger via the second sensing-enabled-units.

7. An under-screen fingerprint sensing method, applied to an electronic apparatus, wherein the electronic apparatus comprises a processing circuit, a touch panel, and a fingerprint sensing apparatus, the fingerprint sensing apparatus comprises a plurality of optical fingerprint sensing units, and the method comprises:
providing, by the touch panel, touch information of a finger to the processing circuit in response to the finger touch detected by the touch panel;
determining, by the processing circuit, a fingerprint sensing region based on the touch information; and
driving, by the processing circuit, a plurality of first sensing-enabled-units among the optical fingerprint sensing units based on the fingerprint sensing region, such that the fingerprint sensing apparatus obtains a fingerprint image of the finger via the first sensing-enabled-units, wherein the first sensing-enabled-units are a part of the optical fingerprint sensing units,
wherein the first sensing-enabled-units are a part of the optical fingerprint sensing units,
wherein the touch information comprises distribution of a touch sensing value obtained by the touch panel after the touch panel detects the touch of the finger, and the step of determining, by the processing circuit, the fingerprint sensing region based on the touch information comprises: determining, by the processing circuit, a location and a size of the fingerprint sensing region based on distribution of the touch sensing value, and wherein the step of determining, by the processing circuit, the location and the size of the fingerprint sensing region based on distribution of the touch sensing value comprises:
  determining, by the processing circuit, the location of the fingerprint sensing region based on a peak of distribution of the touch sensing value; and
  determining, by the processing circuit, the size of the fingerprint sensing region based on a distribution variation width of distribution of the touch sensing value.

8. The under-screen fingerprint sensing method according to claim 7, wherein distribution of the touch sensing value comprises distribution of a first touch sensing value associated with a first axial direction and distribution of a second touch sensing value associated with a second axial direction, and the step of determining, by the processing circuit, the size of the fingerprint sensing region based on the distribution variation width of distribution of the touch sensing value comprises: determining, by the processing circuit, a first side length of the size based on a distribution variation width of distribution of the first touch sensing value, and determining a second side length of the size based on a distribution variation width of distribution of the second touch sensing value, wherein the fingerprint sensing region is a rectangle having the first side length and the second side length.

9. The under-screen fingerprint sensing method according to claim 7, wherein distribution of the touch sensing value comprises distribution of a first touch sensing value associated with a first axial direction and distribution of a second touch sensing value associated with a second axial direction, and the step of determining, by the processing circuit, the size of the fingerprint sensing region based on the distribution variation width of distribution of the touch sensing value comprises: determining, by the processing circuit, a side length of the size based on a distribution variation width of distribution of the first touch sensing value or a distribution variation width of distribution of the second touch sensing value, wherein the fingerprint sensing region is a square having the side length.

10. The under-screen fingerprint sensing method according to claim 7, wherein the step of driving, by the processing circuit, the plurality of first sensing-enabled-units among the optical fingerprint sensing units based on the fingerprint sensing region, such that the fingerprint sensing apparatus obtains the fingerprint image of the finger via the first sensing-enabled-units comprises: providing, by the processing circuit, a plurality of drive signals to the first sensing-enabled-units based on the location and the size of the fingerprint sensing region, such that the fingerprint sensing apparatus obtains image sensing information of the fingerprint image by using the first sensing-enabled-units.

11. The under-screen fingerprint sensing method according to claim 7, wherein an image size of the fingerprint image is determined based on a quantity of the first sensing-enabled-units.

12. The under-screen fingerprint sensing method according to claim 7, wherein the method further comprises:
  providing, by the touch panel, another touch information of another finger to the processing circuit in response to touch of both the finger and the other finger detected by the touch panel;
  determining, by the processing circuit, another fingerprint sensing region based on the another touch information; and
  driving, by the processing circuit, a plurality of second sensing-enabled-units among the optical fingerprint sensing units based on the another fingerprint sensing region, such that the fingerprint sensing apparatus obtains another fingerprint image of the another finger via the second sensing-enabled-units.

* * * * *